(12) United States Patent
Ashworth

(10) Patent No.: US 6,348,869 B1
(45) Date of Patent: Feb. 19, 2002

(54) PIPE LEAK DETECTION

(75) Inventor: Roger Philip Ashworth, Loughborough (GB)

(73) Assignee: Lattice Intellectual Property Limited, London (GB)

( * ) Notice: Subject to any disclaimer, the term of this patent is extended or adjusted under 35 U.S.C. 154(b) by 0 days.

(21) Appl. No.: 09/486,730

(22) PCT Filed: Aug. 20, 1998

(86) PCT No.: PCT/GB98/02513

§ 371 Date: Mar. 28, 2000

§ 102(e) Date: Mar. 28, 2000

(87) PCT Pub. No.: WO99/13309

PCT Pub. Date: Mar. 18, 1999

(30) Foreign Application Priority Data

Sep. 10, 1997 (GB) .............................................. 9719101

(51) Int. Cl.⁷ .............................................. G08B 21/00
(52) U.S. Cl. ..................... 340/605; 340/611; 73/40; 73/40.5 R; 73/49.1; 138/93
(58) Field of Search ................... 340/605, 603, 340/611, 632; 73/37, 40, 40.5 R, 49.1; 137/599.11, 237, 247, 247.11; 138/93, 97

(56) References Cited

U.S. PATENT DOCUMENTS 3,958,607 A * 5/1976 Gray ........................... 138/57
3,974,680 A * 8/1976 Beaver ........................ 73/40.5
4,402,213 A * 9/1983 Hogan ..................... 73/40.5 R
4,484,602 A * 11/1984 Guthrie ........................ 138/93
5,934,311 A * 8/1999 Brown ........................ 137/240

FOREIGN PATENT DOCUMENTS

DE 4328574 C1 * 10/1974
JP 61246647 * 11/1986

* cited by examiner

Primary Examiner—Julie Lieu
(74) Attorney, Agent, or Firm—Oblon, Spivak, McClelland, Maier & Neustadt, P.C.

(57) ABSTRACT

A pipe leak testing arrangement which includes a device having sealing bags joined by a coupling. When inflated, the bags form a seal volume chamber. The bags may not form a perfect seal, and as a result leakage past the bags may occur when a differential pressure is present. A remaining portion of the pipe forms a test volume chamber. A first transducer measures differential pressure between the chambers and a further transducer measures the test chamber pressure. Measured pressure information is used by a control device to track pressure change and to adjust the seal pressure so as to maintain equal pressures even if the test pressure decays due to a pipe fracture. In an alternative arrangement, two separate devices with associated circuitry are provided to facilitate two temporary seal pressure chambers with the test chamber therebetween.

19 Claims, 5 Drawing Sheets

PIPE LEAK DETECTION

BACKGROUND OF THE INVENTION

1. Field of the Invention

The invention relates to measuring leakage through ducts, typically fluid carrying pipes.

2. Discussion of the Background

In fluid carrying pipes such as gas mains, for, example, it has been necessary to isolate sections of main carrying the gas by cut out and bypass techniques and then capping-off. This is time consuming and costly. With service pipes it is again disruptive to determine leaks.

SUMMARY OF THE INVENTION

The present invention is concerned with providing a less disruptive and less expensive mechanism to provide an accurate pressure leakage test of pipes.

According to the invention there is provided a leak testing system for pipes including means for providing a temporary seal at a first location;
  means for providing a substantially equal pressure between the first location and an adjacent test location to prevent fluid passage therebetween;
  means for determining any pressure decay at the test location indicative of pipe leakage; and
  means for adjusting the pressure in the first location to track any pressure decay in the test location so as to maintain the substantially equal pressure between the first and test locations during testing.

Further according to the invention there is provided a method for testing leaks in pipes and comprising:
  providing a temporary seal at a first location;
  providing a substantially equal pressure between the first location and an adjacent test location to prevent fluid passage therebetween;
  determining any pressure decay at the test location indicative of pipe leakage; and
  adjusting the pressure in the first location to track any pressure decay in the test location so as to maintain the substantially equal pressure between the first and test locations during testing.

BRIEF DESCRIPTION OF THE DRAWINGS

The invention will now be described by way of example with reference to the accompanying drawings in which.

DESCRIPTION OF THE PREFERRED EMBODIMENTS

Figure 1:
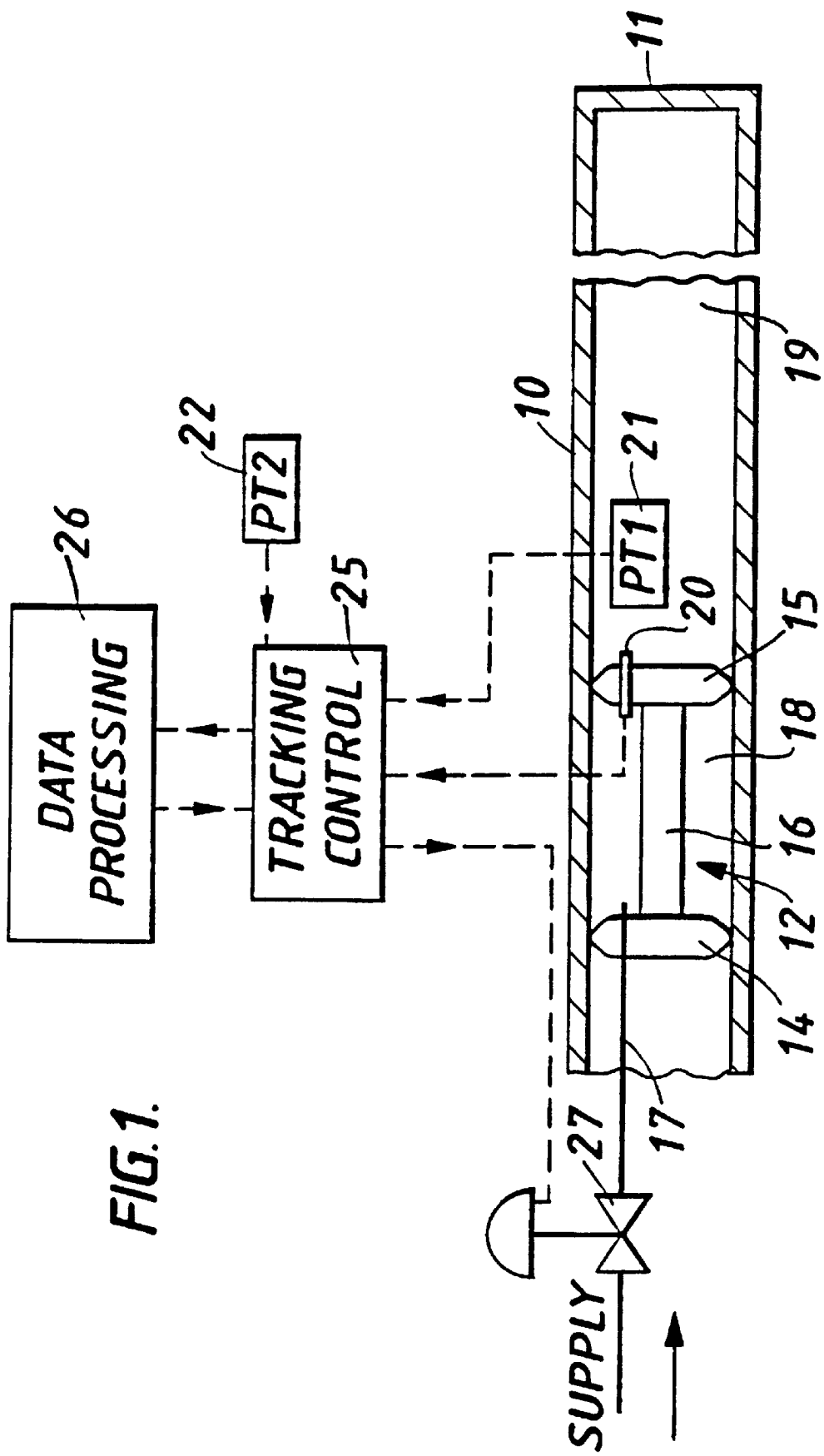
FIG. 1 shows a first embodiment of the invention.

The arrangement of FIG. 1 is configured to provide two seal volumes with a virtual seal therebetween. A pipe 10, typically carrying a fluid under pressure, e.g. natural gas, is shown sealed at one end 11. This seal may be permanent or merely temporary to allow the test apparatus to be utilized.

The leakage test device 12 includes a first seal member 14 and a second member 15 joined by coupling 16. The seal members 14 and 15 can be inflatable bags which when inflated form a seal with the pipe so as to define a seal volume chamber 18. The bag seals may, in practice, be imperfect and have the potential of leakage past them. The configuration described below accommodates such a leaky seal. The remaining portion of the pipe towards the sealed end 11 forms a test volume chamber 19.

A transducer 20 is provided to measure the differential pressure between chambers 18 and 19. A transducer 21 measures the actual pressure within the test chamber 19. A further transducer 22 provides measurements of atmospheric pressure. A tracking control device 25 receives pressure information from transducers 20 and 21 and adjusts supply valve 27 to maintain substantially the same pressure in seal chamber 18 as within the remainder of the pipe forming the test chamber 19. As leakage from the test volume may occur due to a small imperfection in the pipe (such as leakage at a joint or pinhole corrosion), this will cause a drop in pressure in chamber 19 and so chamber 18 pressure is automatically adjusted accordingly to prevent the risk of leakage over the sealing edge of the bag 15 if there is a differential pressure present.

Similarly, if there is leakage around the sealing edge of the bag 14, the differential pressure measurement will cause the tracking control to adjust the pressure from supply 27 via pipe 17. The supply regulator will have means to vent gas as well as supply it, in order to maintain the required seal volume pressure.

If leakage is present in the test volume part of the pipe, the control 25 will then track the test pressure as it falls and so the pressure drop across the band of pressures can be used to give an accurate leakage versus pressure profile.

A data handling device shown as processor 26 will store information for analysis. This can be configured using a portable computer.

The small changes in differential pressure as the control tracks this and brings this back in to line will indicate the system is operating correctly. No change could indicate a deflated bag 15.

In practice the test device 12 would be connected to an umbilical which would carry the supply pressure pipe as well as bag inflation supply and connections for the transducers. The umbilical would typically pass through a seal at the end remote from the test volume chamber.

Figure 2:
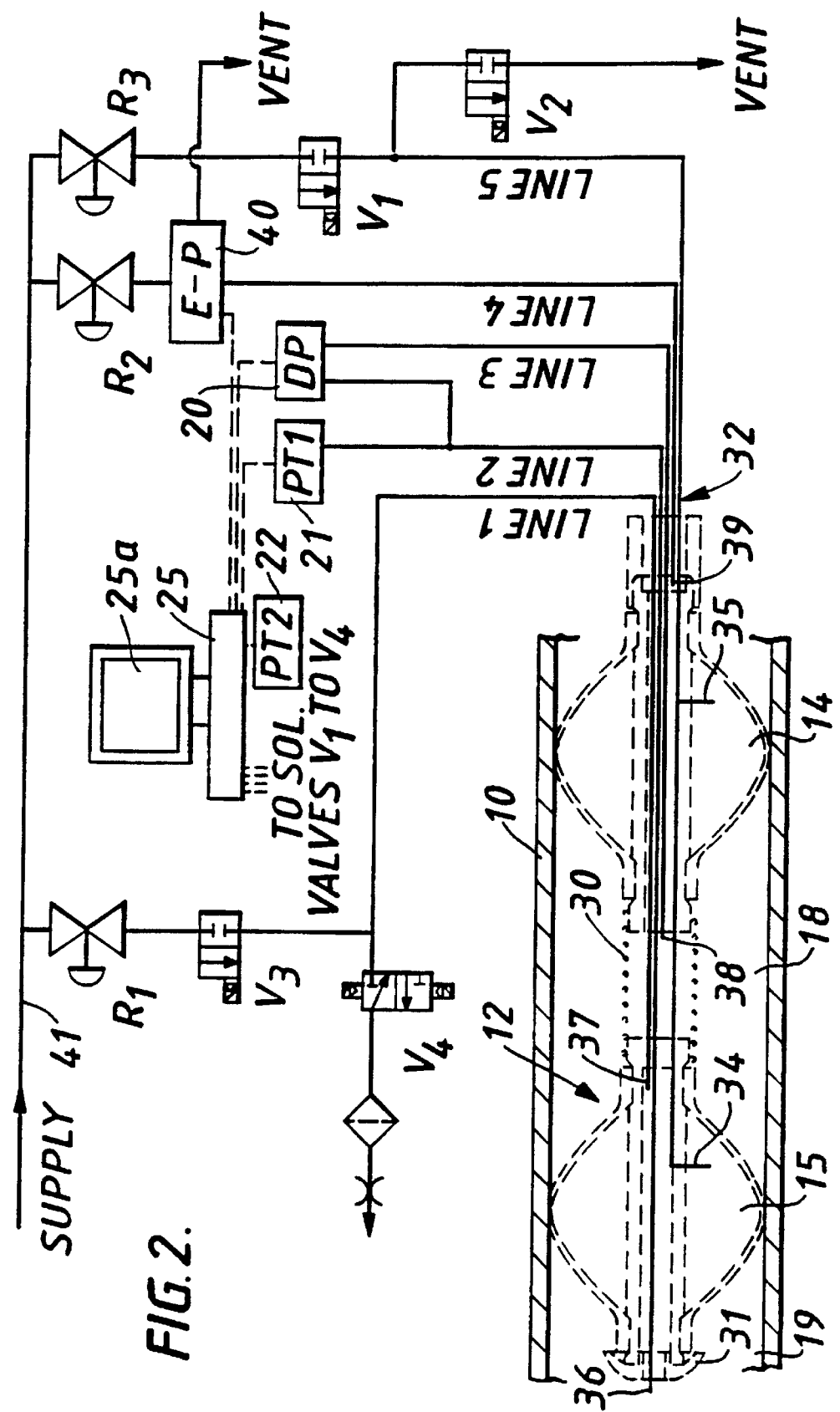
FIG. 2 shows a more detailed arrangement.

A more detailed arrangement for the FIG. 1 configuration is shown in FIG. 2.

The test device 12 shows the bags 14 and 15 coupled via a spring element 30 (e.g. helical spring) to allow flexibility during insertion taking into account pipe bends. The bags when deflated will be less than the diameter of guide-piece 31 which may be a shaped plastic cap to assist in insertion. The cap is of a sufficient diameter to reduce damage risk to the following deflated bags. The umbilical 32 will be of reinforced plastic and carries pneumatic sense and control lines (lines 1–5). In practice transducers 20 and 21 are provided outside the pipeline and have small sensing lines attached.

A pressurized gas supply is received on line 41 and can be provided to the pneumatic lines via regulators R1–R3. Switching the lines is effected by solenoid valves V1–V4.

Line 1 is connected between the test volume and solenoid valves V3 and V4. It can be used to increase pressure in the test volume (at location 37), up to a maximum pressure set by regulator R1, by opening valve V3, or as a path to a calibrated leak by opening valve V4. This latter function is required for test volume quantification.

Line 2 is a sense line connected between the test volume (termination 36) and the absolute pressure transducer 21 to provide a reference signal for the electro-pneumatic (EP) tracking regulator 40 set point. A tapping from this line connects to one side of the DP transducer 20.

Line 3 is a sense line connected between the seal volume (termination 38) and the other side of the DP transducer 20. The DP transducer measurement provides an error signal which can be used for fine tuning of the tracking controller 25 (configured as a portable computer with associated screen 25a).

Line 4 connects the outlet of the EP tracking regulator to the seal volume so as to control the seal volume pressure (termination 39).

Line 5 allows the bag seals to be inflated or deflated by the opening of normally closed solenoid valves V1 or V2 respectively.

Figure 3:
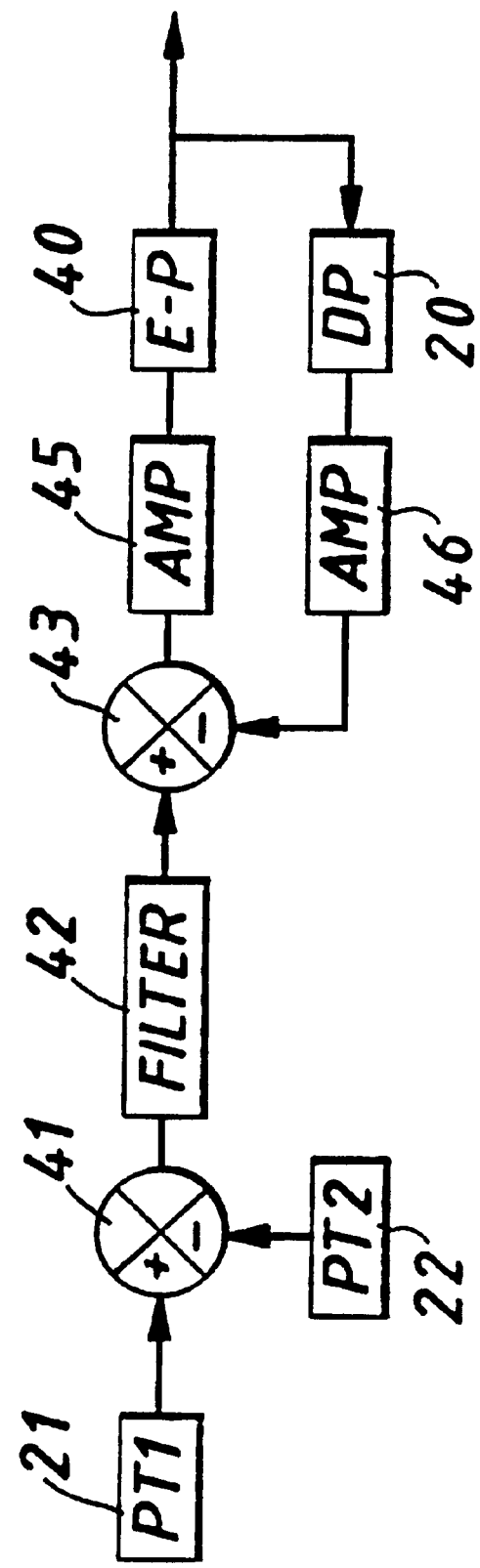
FIG. 3 shows a schematic diagram for tracking control.

FIG. 3 shows the tracking control function illustrated schematically. The absolute test volume pressure from transducer 21 together with the atmospheric pressure from transducer 22 are subtracted in subtractor 41 and filtered via filter 42. Following amplification in amplifier 45 it is received as the reference signal for the EP regulator set point. The differential pressure measured by transducer 20 will be amplified and passes as a feedback signal to subtractor 43 to cause it for the EP regulator pressure to be brought back on track if a differential pressure is measured. Although the arrangement could be hardwired it is convenient for this operating function to be under software control.

The invention has been described in relation to a single configuration for use typically with small diameter service pipes. However it is possible for the arrangement to be modified so as to be applicable to larger, higher pressure gas pipes. In such a configuration two spaced devices are arranged each with their own seal volume chamber and defining therebetween the test volume chamber. This allows the devices to seal each end of the test volume and ensures that leakage does not occur from either end as the seal volume pressure will correspond to that within the test volume and will track this should it fall due to pipe imperfection.

Figure 4:
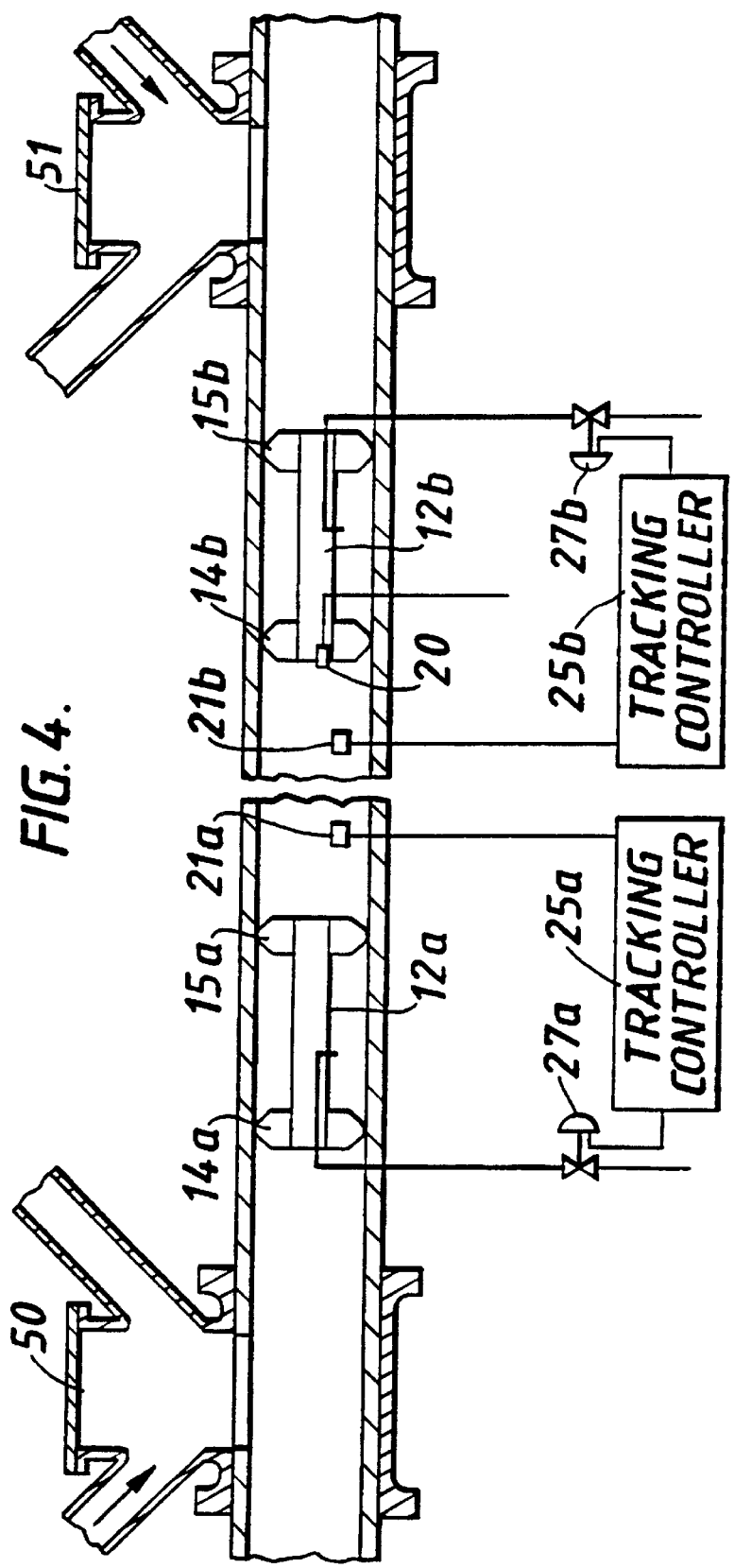
FIG. 4 shows a further arrangement showing two test assemblies.

The expanded configuration is shown in FIG. 4 and includes two test devices 12a and 12b. They will each have associated circuitry as shown in the figure. The devices with associated umbilical can be inserted into the pipeline via the camera launching tubes 50 and 51 of known construction.

Figure 5:
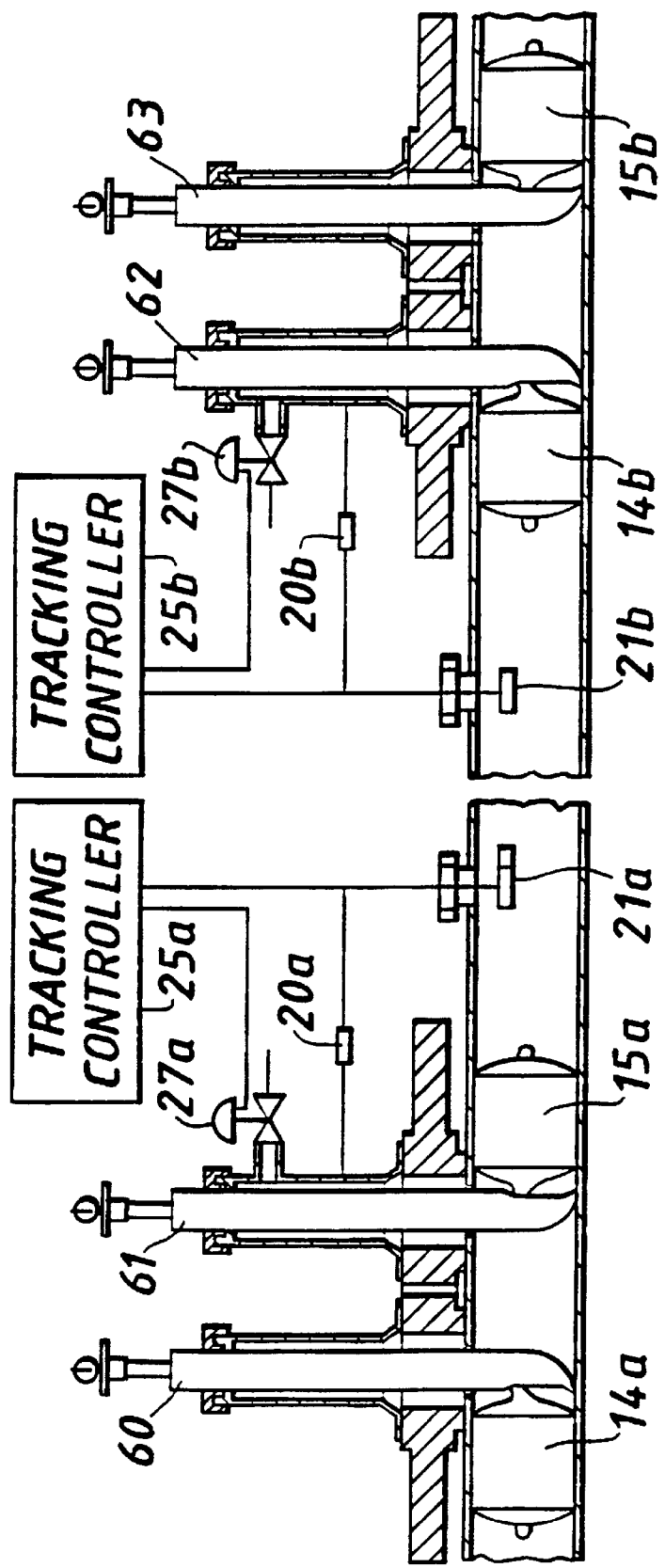
FIG. 5 illustrates an alternative configuration.

In an alternative configuration shown in FIG. 5, the structure takes advantage of known iris valves 60, 61, 62 and 63. In this arrangement the bags are inserted separately. However in combination with the measurement transducers and the tracking control they provide a similar sealing and testing configuration to that of FIG. 4.

What is claimed is:

1. A leak testing system for pipes including means for providing a temporary seal at a first location in a pipe; means for providing a substantially equal pressure between the first location and an adjacent test location in the pipe to prevent fluid passage therebetween; means for determining any pressure decay at the test location indicative of pipe leakage; and means for measuring and adjusting the pressure in the first location to track the pressure in the test location so as to maintain the substantially equal pressure between the first and test locations during testing.

2. A system as claimed in claim 1 wherein the means for providing a temporary seal comprise a first sealing member spaced from a second sealing member so as to define a first seal chamber with the inner pipe wall.

3. A system as claimed in claim 2 including third and fourth sealing members for location at a spaced position to provide a second seal chamber, the pipe portion between the first and second seal chambers comprising a test chamber.

4. A system as claimed in claim 1 including atmospheric pressure sensor means for providing pressure information to assist in determining leakage.

5. A leak testing system for pipes comprising:
 means for providing a temporary seal at a first location in a pipe;
 means for providing a substantially equal pressure between the first location and an adjacent test location in the pipe to prevent fluid passage therebetween;
 means for determining any pressure decay at the test location indicative of pipe leakage; and
 means for measuring and adjusting the pressure in the first location to track the pressure in the test location so as to maintain the substantially equal pressure between the first and test locations during testing,
 wherein the means for providing a substantially equal pressure includes a source of fluid under pressure, valve means for introducing fluid into the first location and differential pressure detection means for determining when the pressure in the first and test locations are equal.

6. A system as claimed in claim 5 wherein the means for adjusting the pressure in the first location to track pressure decay includes means connected to the differential pressure detection means and control means to operate the valve means to reduce pressure at the first location if the test location pressure falls.

7. A system as claimed in claim 5 wherein the means for providing a temporary seal includes first and second spaced inflatable bags providing the first location therebetween.

8. A system as claimed in claim 7 wherein umbilical means are provided connected to the bags to allow remote inflation and pressure determination.

9. A system as claimed in claim 7 wherein the first and second bags are resiliently coupled to allow passage through bends in the pipe and wherein protector means are provided to prevent damage to the bags when deflated during passage through the pipe.

10. A system as claimed in claim 5 including an electronic control device for continuously determining the pressure in the test location and the differential pressure between the first and test locations, so as to continuously compensate for any pressure decay in the test location whilst continuously determining the absolute pressure in the test location.

11. A system as claimed in claim 10 including storage means for holding parameter information.

12. A system as claimed in claim 10 including means for adjusting the absolute pressure information from the test location in dependence on measured atmospheric pressure, filter means for filtering the measured signals and means for providing an adjusted fluid pressure signal for pressure control to the first location dependent on the measured signals.

13. A system as claimed in claim 12 including feedback means taking into account the differential pressure measurement.

14. A method for testing leaks in pipes and comprising:
 providing a temporary seal at a first location in a pipe;
 providing a substantially equal pressure between the first location and an adjacent test location in the pipe to prevent fluid passage therebetween;
 determining any pressure decay at the test location indicative of pipe leakage; and measuring and adjusting the pressure in the first location to track the pressure in the test location so as to maintain the substantially equal pressure between the first and test locations during testing.

15. A method as claimed in claim 14 including providing a first seal spaced from a second seal so as to define a first seal chamber with the inner pipe wall.

16. A method as claimed in claim 15 including providing a third and fourth seal located at a spaced position to provide a second seal chamber, the pipe portion between the first and second seal chambers comprising a test chamber.

17. A method for testing leaks in pipes comprising the steps of:

providing a temporary seal at a first location in a pipe;

providing a substantially equal pressure between the first location and an adjacent test location in the pipe to prevent fluid passage therebetween;

determining any pressure decay at the test location indicative of pipe leakage;

measuring and adjusting the pressure in the first location to track the pressure in the test location so as to maintain the substantially equal pressure between the first and test locations during testing;

providing a source of fluid under pressure;

introducing fluid into the first location; and detecting differential pressure to determine that the pressure in the first and test locations is equal.

18. A method as claimed in claim 14 including measuring atmospheric pressure for providing pressure information to assist in determining leakage.

19. A method as claimed in claim 17 including continuously determining the pressure in the test location and the differential pressure between the first and test locations so as to continuously compensate for any pressure decay in the test location whilst continuously determining the absolute pressure loss in the test location.

\* \* \* \* \*